(12) United States Patent
Park et al.

(10) Patent No.: US 11,556,848 B2
(45) Date of Patent: Jan. 17, 2023

(54) RESOLVING CONFLICTS BETWEEN EXPERTS' INTUITION AND DATA-DRIVEN ARTIFICIAL INTELLIGENCE MODELS

(71) Applicant: International Business Machines Corporation, Armonk, NY (US)

(72) Inventors: Hogun Park, West Lafayette, IN (US); Peifeng Yin, San Jose, CA (US); Aly Megahed, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 16/659,418

(22) Filed: Oct. 21, 2019

(65) Prior Publication Data
US 2021/0117854 A1 Apr. 22, 2021

(51) Int. Cl.
*G06N 20/00* (2019.01)
*G06K 9/62* (2022.01)
*G06N 3/04* (2006.01)

(52) U.S. Cl.
CPC ........... *G06N 20/00* (2019.01); *G06K 9/6215* (2013.01); *G06K 9/6256* (2013.01); *G06N 3/0454* (2013.01)

(58) Field of Classification Search
CPC .... G06N 20/00; G06N 3/0454; G06N 3/0472; G06N 3/088; G06N 3/0427; G06N 5/02; G06N 7/005; G06N 5/04; G06N 20/20; G06K 9/6215; G06K 9/6256; G06K 9/6263
See application file for complete search history.

(56) References Cited

U.S. PATENT DOCUMENTS

| | | | | |
|---|---|---|---|---|
| 7,194,477 B1* | 3/2007 | Bradley | ................ | G06Q 30/02 707/999.102 |
| 7,318,012 B2* | 1/2008 | Brueckner | ........ | G06F 16/24578 703/2 |
| 7,596,546 B2* | 9/2009 | Matchett | ................ | G06Q 10/10 707/999.1 |
| 7,752,233 B2* | 7/2010 | Vempala | ............... | G06F 16/322 707/790 |
| 7,769,843 B2* | 8/2010 | Neuse | ................ | G06Q 30/0283 705/400 |

(Continued)

OTHER PUBLICATIONS

Zhou, X. et al., "Stock Market Prediction on High-Frequency Data Using Generative Adversarial Nets," Mathematical Problems in Engineering, 2018, 11 pages, vol. 2018, Article ID 4907423, Hindawi, United Kingdom.

(Continued)

*Primary Examiner* — Lewis G West
(74) *Attorney, Agent, or Firm* — Sherman IP LLP; Kenneth L. Sherman; Hemavathy Perumal (57) ABSTRACT

One embodiment provides a method comprising receiving training data and experts' intuition, training a machine learning model based on the training data, predicting a class label for a new data input based on the machine learning model, estimating a degree of similarity of a target attribute of the new data input relative to the training data, and selectively applying a correction to the class label for the new data input based on the degree of similarity prior to providing the class label as an output. The target attribute is an attribute related to the experts' intuition.

20 Claims, 6 Drawing Sheets

(56) References Cited

U.S. PATENT DOCUMENTS

| | | | | |
|---|---|---|---|---|
| 7,937,465 | B2* | 5/2011 | Firminger | G16H 50/70 702/182 |
| 7,945,632 | B2* | 5/2011 | Firminger | G16H 10/60 702/182 |
| 7,957,948 | B2* | 6/2011 | Zink | G06F 11/3419 703/22 |
| 8,010,662 | B2* | 8/2011 | Firminger | H04L 67/535 709/224 |
| 8,010,663 | B2* | 8/2011 | Firminger | G06F 16/24575 709/224 |
| 8,010,664 | B2* | 8/2011 | Firminger | G06F 16/24575 709/224 |
| 8,028,063 | B2* | 9/2011 | Firminger | G06F 16/24575 709/224 |
| 8,032,628 | B2* | 10/2011 | Firminger | G16H 50/70 709/224 |
| 8,086,668 | B2* | 12/2011 | Firminger | G06F 16/24575 370/242 |
| 8,103,613 | B2* | 1/2012 | Firminger | G16H 50/70 709/224 |
| 8,127,002 | B2* | 2/2012 | Firminger | G06Q 30/02 709/224 |
| 8,180,830 | B2* | 5/2012 | Firminger | G06N 5/02 709/224 |
| 8,180,890 | B2* | 5/2012 | Firminger | G06Q 10/10 709/224 |
| 8,224,842 | B2* | 7/2012 | Firminger | G06N 5/04 709/224 |
| 8,224,956 | B2* | 7/2012 | Firminger | G06Q 10/10 715/764 |
| 8,239,488 | B2* | 8/2012 | Firminger | G06Q 10/10 709/224 |
| 8,260,912 | B2* | 9/2012 | Firminger | G06Q 10/10 709/224 |
| 8,533,182 | B1* | 9/2013 | Charboneau | G06F 16/90335 707/718 |
| 8,560,488 | B2* | 10/2013 | Yoshimoto | G06K 9/6215 706/13 |
| 8,577,825 | B2* | 11/2013 | Gillespie | G06F 17/11 706/46 |
| 8,788,986 | B2* | 7/2014 | Zink | H04L 41/022 716/101 |
| 8,805,581 | B2* | 8/2014 | Barajas | B25J 9/163 700/250 |
| 9,262,719 | B2* | 2/2016 | Soon-Shiong | G06N 5/043 |
| 9,583,020 | B1* | 2/2017 | Kronfeld | G09B 9/16 |
| 9,971,815 | B2* | 5/2018 | Merg | G06F 16/951 |
| 10,467,226 | B2* | 11/2019 | Hill | G06F 16/2428 |
| 10,719,301 | B1* | 7/2020 | Dasgupta | G06K 9/6267 |
| 10,860,683 | B2* | 12/2020 | Xu | G06F 17/18 |
| 11,120,364 | B1* | 9/2021 | Gokalp | G06N 20/00 |
| 2003/0120651 | A1* | 6/2003 | Bernstein | G06F 16/258 |
| 2004/0103108 | A1* | 5/2004 | Andreev | G06F 16/285 706/50 |
| 2009/0204556 | A1* | 8/2009 | Weston | G06K 9/6276 706/12 |
| 2016/0163522 | A1* | 6/2016 | Röder | H01J 49/164 250/281 |
| 2018/0082172 | A1* | 3/2018 | Patel | G06N 3/08 |
| 2018/0197106 | A1 | 7/2018 | Fujitani et al. | |
| 2018/0260703 | A1 | 9/2018 | Soljacic et al. | |
| 2019/0019061 | A1* | 1/2019 | Trenholm | G06K 9/6218 |
| 2020/0082250 | A1* | 3/2020 | Guan | G06F 30/20 |
| 2020/0327418 | A1* | 10/2020 | Lyons | G06V 40/11 |
| 2021/0043216 | A1* | 2/2021 | Wang | G10L 17/18 |
| 2021/0056684 | A1* | 2/2021 | Zhou | G06V 10/764 |
| 2021/0063578 | A1* | 3/2021 | Wekel | G06K 9/6288 |
| 2021/0089842 | A1* | 3/2021 | Rosenfeld | G06K 9/6277 |
| 2021/0117854 | A1* | 4/2021 | Park | G06K 9/6263 |
| 2021/0357652 | A1* | 11/2021 | Wu | G06V 10/56 |
| 2021/0406532 | A1* | 12/2021 | Qu | G06V 40/11 |
| 2022/0027777 | A1* | 1/2022 | Schmidt | G06F 16/901 |
| 2022/0044352 | A1* | 2/2022 | Liao | G06K 9/6247 |
| 2022/0058981 | A1* | 2/2022 | Neumann | G06F 16/90335 |
| 2022/0139072 | A1* | 5/2022 | Klaiman | G16H 30/40 382/159 |
| 2022/0172847 | A1* | 6/2022 | Shinozaki | G16H 50/30 |
| 2022/0180490 | A1* | 6/2022 | Jo | G06T 11/60 |

OTHER PUBLICATIONS

Li, Q. et al., "Resolving Conflicts in Heterogeneous Data by Truth Discovery and Source Reliability Estimation," SIGMOD'14, Jun. 22-27, 2014, ACM, United States.

Ben-David, A., "Monotonicity maintenance in information-theoretic machine learning algorithms", Machine Learning 19.1, 1995, p. 29-43, Kluwer Academic Publishers, Boston, MA.

Potharst, R. et al., "Classification trees for problems with monotonicity constraints", SIGKDD Explorations Newsletter 4.1, Apr. 2002, p. 1-39, ACM, United States.

Archer, N.P. et al., "Application of the back propagation neural network algorithm with monotonicity constraints for two-group classification problems", Decision Sciences 24.1, Jan. 1993, pp. 60-75, vol. 24, issue 1, Wiley Online Library, {Abstract Only}.

Sill, J., "Monotonic networks", Advances in neural information processing systems (NIPS), 1998, pp. 661-667, MIT Press, United States.

Duivesteijn, W., et al., "Nearest neighbour classification with monotonicity constraints", Joint European Conference on Machine Learning and Knowledge Discovery in Databases (ECML PKDD), 2008, pp. 301-316, Springer-Verlag, Berlin.

Zhi, W., et al., "Clustering with complex constraints—algorithms and applications," Proceedings of the Twenty-Seventh AAAI Conference on Artificial Intelligence, 2013, pp. 1056-1062, AAAI Press, United States.

Mann, G.S. et al., "Simple, robust, scalable semi-supervised learning via expectation regularization", International Conference on Machine Learning (ICML), 2007, pp. 1-0, ACM, United States.

Stewart, R. et al., "Label-free supervision of neural networks with physics and domain knowledge." AAAI Conference on Artificial Intelligence, 2017, pp. 2576-2582, AAAI Press, United States.

Niculescu, R. et al., "Bayesian network learning with parameter constraints", Journal of Machine Learning Research, Jul. 2006, pp. 1357-1383, United States.

Ermon, S. et al., "Pattern Decomposition with Complex Combinatorial Constraints: Application to Materials Discovery," Proceedings of the Twenty-Ninth AAAI Conference on Artificial Intelligence, 2015, pp. 636-643, AAAI Press, United States.

Altendorf, E.E., "Constraining Bayesian Network Learning with Qualitative Models," An Abstract of the Thesis of Eric E. Altendor, May 6, 2005, pp. 1-97, Oregon State University, Oregon.

Druck, G. et al., "Learning from labeled features using generalized expectation criteria," Proceedings of the 31st annual international ACM SIGIR conference on Research and development in information retrieval, 2008, pp. 595-602, ACM, United States.

Kotzias, D. et al., "From Group to Individual Labels using Deep Features," KDD' 15, Aug. 2015, pp. 1-10, ACM, United States.

Zhuang, B. et al., "Fast Training of Triplet-based Deep Binary Embedding Networks," Proceedings of the IEEE Conference on Computer Vision and Pattern Recognition, 2016, pp. 5955-5964, IEEE, United States.

Lin, K. et al., "Learning Compact Binary Descriptors with Unsupervised Deep Neural Networks," Proceedings of the IEEE Conference on Computer Vision and Pattern Recognition, 2016, pp. 1-10, IEEE, United States.

Zhou, Z-H et al., "On the Relation Between Multi-Instance Learning and Semi-Supervised Learning," Proceedings of the 24th International Conference on Machine Learning, 2007, pp. 1167-1174, ACM, United States.

Dietterich, T.G. et al., "Solving the multiple instance problem with axis-parallel rectangles," Artificial Intelligence 89, 1997, pp. 31-71, No. 1-2, Elsevier Science B.V., New York, United States.

* cited by examiner

RESOLVING CONFLICTS BETWEEN EXPERTS' INTUITION AND DATA-DRIVEN ARTIFICIAL INTELLIGENCE MODELS

BACKGROUND

Embodiments of the present invention generally relate to artificial intelligence, and more particularly, to a method and system for resolving conflicts between experts' intuition and data-driven artificial intelligence models.

SUMMARY

One embodiment provides a method comprising receiving training data and experts' intuition, training a machine learning model based on the training data, predicting a class label for a new data input based on the machine learning model, estimating a degree of similarity of a target attribute of the new data input relative to the training data, and selectively applying a correction to the class label for the new data input based on the degree of similarity prior to providing the class label as an output. The target attribute is an attribute related to the experts' intuition.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Embodiments of the present invention generally relate to artificial intelligence, and more particularly, to a method and system for resolving conflicts between experts' intuition and data-driven artificial intelligence models. One embodiment provides a method comprising receiving training data and experts' intuition, training a machine learning model based on the training data, predicting a class label for a new data input based on the machine learning model, estimating a degree of similarity of a target attribute of the new data input relative to the training data, and selectively applying a correction to the class label for the new data input based on the degree of similarity prior to providing the class label as an output. The target attribute is an attribute related to the experts' intuition.

For expository purposes, the term "experts' intuition" as used herein generally refers to one or more insights/opinions of one or more domain/field experts (i.e., individuals or entities who are experts in their domain/field) that are based on the experts' experience in their domain/field and that have yet to be formally defined or statistically explained by available data (e.g., cannot be captured statistically from training data).

For expository purposes, the term "intuition-related attribute" as used herein generally refers to an attribute related to experts' intuition having a value that can be controlled and changed by a human. Examples of intuition-related attributes include, but are not limited to, a bidding price (i.e., sale price) for a service deal that a salesman can control and change.

For expository purposes, the term "intuition-free attribute" as used herein generally refers to an attribute having a fixed value that cannot be changed by a human. Examples of intuition-free attributes include, but are not limited to, geography of a client, complexity of a service deal, and services included in the deal.

The terms "attributes" and "features" are used interchangeably herein.

For data-driven artificial intelligence (AI) applications, conventional AI (i.e., machine learning) models utilized by such applications do not correspond to experts' intuition, resulting in conflicts between the models and the experts' intuition. For example, the models and the experts' intuition may have different correlations between variables and class labels (e.g., classifications). As another example, the models and the experts' intuition may have different trends over a variable. Such conflicts arise because of lack of diversified data. Domain/field experts gain from previous experience in their domain/field some intuition about correlations of one or more attributes with a variable; such intuition is not learned by an AI model trained based on given training data. Further, in some application scenarios, obtaining more diversified data is either impossible or incurs a high cost. Conventional solutions for resolving such conflicts include constraining the models or reducing burden associated with individual labeling (i.e., of class labels) by exploiting high-level intuition in the form of constraints.

Embodiments of the invention exploit conflicts between data-driven AI models and experts' intuition. One embodiment provides a framework for identifying such conflicts by estimating degree of relevance/reliability/similarity of new data inputs relative to training data, and, based on the conflicts identified, guiding any type of machine learning model to correct its outputs (i.e., predicted class labels) adaptively to match the experts' intuition while maintaining its performance (i.e., incorporating the experts' intuition into the model). The framework is independent of both the model and the experts' intuition.

Embodiments of the invention resolve conflicts between data-driven AI models and experts' intuition where both are reliable sources, but each is better suited for application in a particular application scenario. Embodiments of the invention provide a mechanism for determining application scenarios when the models should be applied and different application scenarios when the experts' intuition should be applied.

Figure 1:
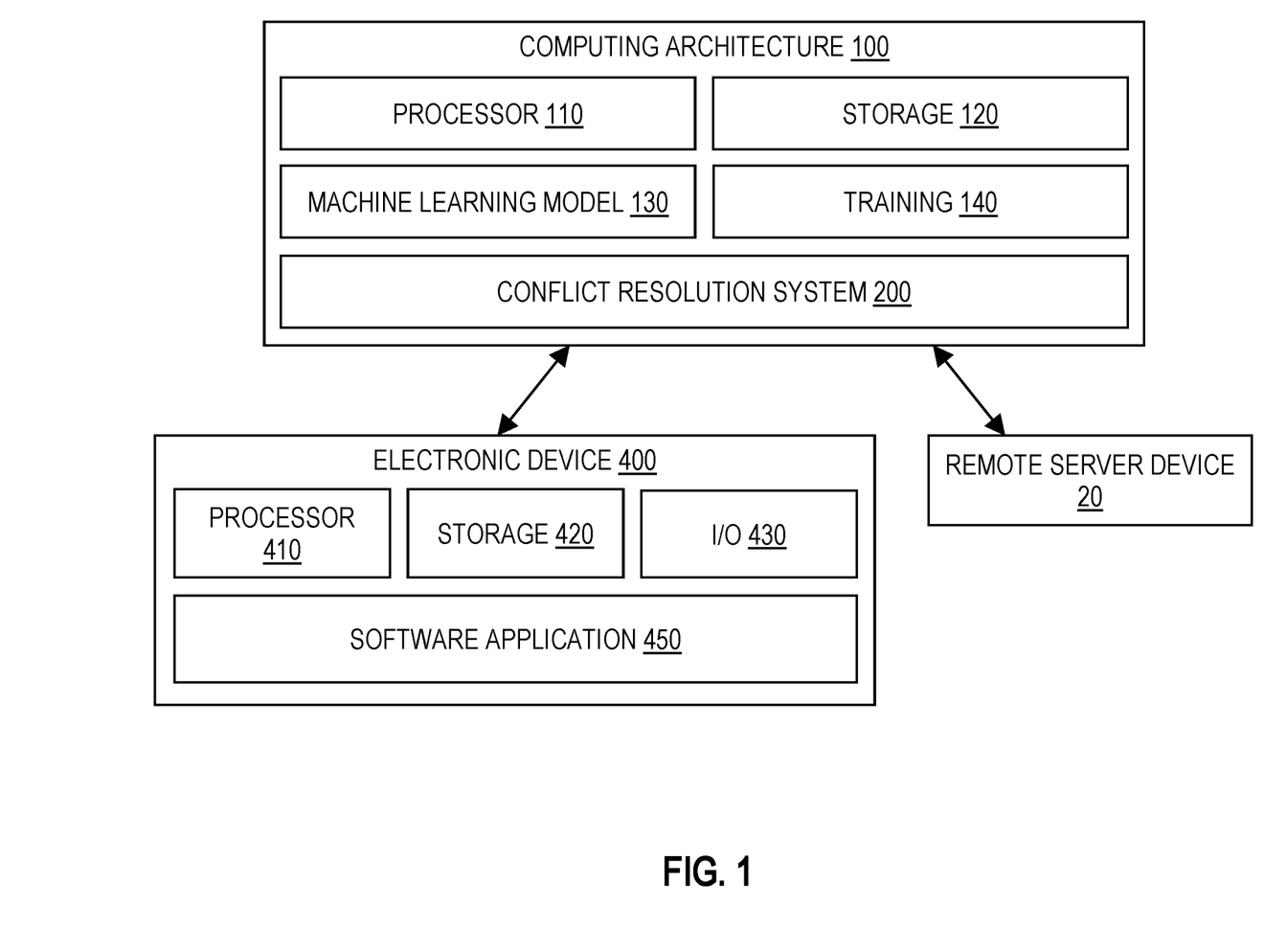
FIG. 1 illustrates an example computing architecture for resolving conflicts between experts' intuition and data-driven machine learning models, in accordance with an embodiment of the invention.

FIG. 1 illustrates an example computing architecture 100 for resolving conflicts between experts' intuition and data-driven machine learning models, in accordance with an embodiment of the invention. In one embodiment, the computing architecture 100 is a centralized computing architecture. In another embodiment, the computing architecture 100 is a distributed computing architecture.

In one embodiment, the computing architecture 100 comprises computation resources such as, but not limited to, one or more processor units 110 and one or more storage units 120. One or more applications may execute/operate on the computing architecture 100 utilizing the computation resources of the computing architecture 100.

In one embodiment, the applications on the computing architecture 100 include, but are not limited to, one or more of the following: (1) a training system 140 configured to train a data-driven machine learning model based on training data (e.g., a machine learning model trained to estimate/predict a class label), (2) one or more machine learning models 130 (e.g., a machine learning model trained by the training system 140), and (3) a conflict resolution system 200 configured to resolve conflicts between experts' intuition and at least one of the machine learning models 130.

In one embodiment, at least one of the machine learning models 130 is a classifier trained to predict/estimate a classification (i.e., class label) for an input. For example, in one embodiment, at least one of the machine learning models 130 is trained to estimate/predict a probability of a service provider (e.g., an IT service provider) successfully bidding on a service contract (e.g., an IT service deal).

In one embodiment, the conflict resolution system 200 and/or the training system 140 are configured to exchange data with one or more electronic devices 400 and/or one or more remote server devices 20 over a connection (e.g., a wireless connection such as a WiFi connection or a cellular data connection, a wired connection, or a combination of the two).

In one embodiment, an electronic device 400 comprises one or more computation resources such as, but not limited to, one or more processor units 410 and one or more storage units 420. One or more applications may execute/operate on an electronic device 400 utilizing the one or more computation resources of the electronic device 400 such as, but not limited to, one or more software applications 450 loaded onto or downloaded to the electronic device 400. Examples of software applications 450 include, but are not limited to, artificial intelligence (AI) applications.

Examples of electronic devices 400 include, but are not limited to, a desktop computer, a mobile device (e.g., a smart phone or a tablet), etc.

In one embodiment, an electronic device 400 comprises one or more input/output (I/O) units 430 integrated in or coupled to the electronic device 400, such as a keyboard, a keypad, a touch interface, a display screen, etc. A user (e.g., an expert) may utilize an I/O module 430 of an electronic device 400 to configure one or more user preferences, configure one or more parameters (e.g., a pre-determined error threshold, pre-defined class labels, etc.), provide input (e.g., experts' intuition), etc.

In one embodiment, an electronic device 400 and/or a remote server device 20 may be a source of training data for at least one of the machine learning models 130. In one embodiment, an electronic device 400 and/or a remote server device 20 may be a source of experts' intuition.

In one embodiment, the conflict resolution system 200 and/or at least one of the machine learning models 130 may be accessed or utilized by one or more online services (e.g., AI services) hosted on a remote server device 20 and/or one or more software applications 450 (e.g., AI applications) operating on an electronic device 400.

Figure 2:
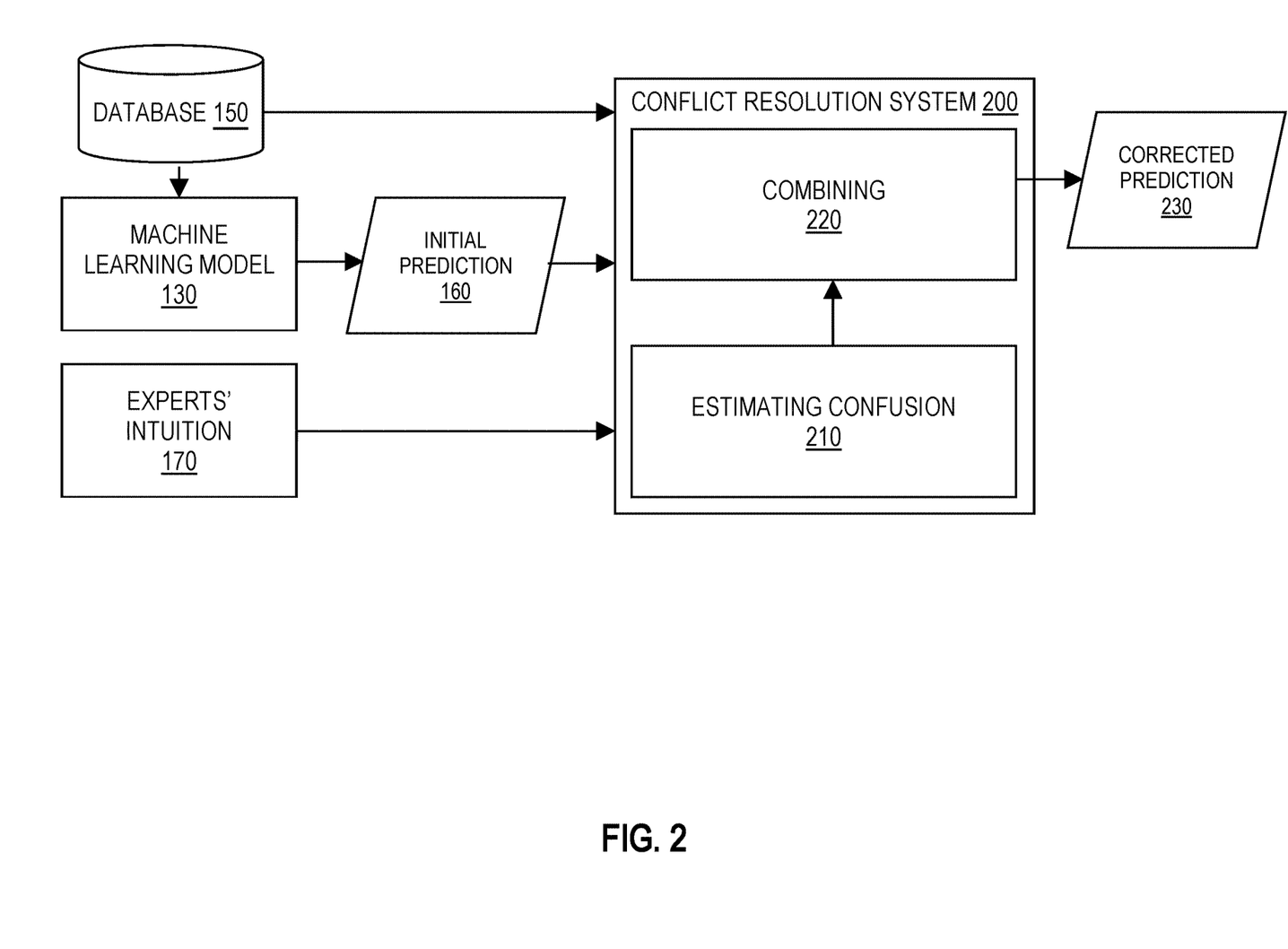
FIG. 2 illustrates an example conflict resolution system, in accordance with an embodiment of the invention.

FIG. 2 illustrates an example conflict resolution system 200, in accordance with an embodiment of the invention. In one embodiment, the system 200 is configured to receive one or more inputs. The inputs include, but are not limited to, the following: (1) data from a database 150 (e.g., a database maintained on a storage unit 120 of the computing architecture 100, a storage unit 420 of an electronic device 400, or on a remote server device 20), such as training data and/or one or more new data inputs (e.g., a new service deal), (2) a data-driven machine learning model 130 (e.g., a machine learning model 130 of the computing architecture 100, a machine learning model from an electronic device 400, or a machine learning model from a remote server device 20), and (3) experts' intuition 170 (e.g., from an electronic device 400 or a remote server device 20).

In one embodiment, the system 200 comprises an estimating confusion unit 210 configured to determine similarity quantification of an unlabeled instance of new data input (e.g., new service deal) to training data. In one embodiment, the unlabeled instance is a data point of the new data input, such as a price point (e.g., a bidding price). In one embodiment, the estimating confusion unit 210 is configured to categorize one or more features of a data point into at least one of the following two groups—intuition-related features and intuition-free features.

Let i generally denote a target attribute that is categorized as intuition-related (i.e., an intuition-related attribute), let $x_i$ generally denote an actual value of the intuition-related target attribute i, and let $x_i^{expected}$ generally denote an expected value of the intuition-related target attribute i based on training data.

For expository purposes, the terms "estimating confusion" and "estimate confusion" as used herein generally refers to a mechanism/process involving determining whether an actual value of an intuition-related target attribute i of a new data input is similar to an expected value of the intuition-related target attribute i based on training data for a machine learning model used to classify the new data input.

In one embodiment, to determine similarity quantification of a data point (i.e., an unlabeled instance, such as a particular price point) of the new data input with an intuition-related target attribute i to the training data, the estimating confusion unit 210 is configured to estimate a degree of relevance/reliability/similarity of the new data input relative to the training data by predicting whether the intuition-related target attribute i is included/represented in the training data. Specifically, the estimating confusion unit 210 is configured to estimate confusion for the intuition-related target attribute i. In one embodiment, the estimating confusion unit 210 is configured to estimate confusion for the intuition-related target attribute i by determining a difference between an expected value $x_i^{expected}$ of the intuition-related target attribute i and an actual value $x_i$ of the intuition-related target attribute i, in accordance with equation (1) provided below:

$$\|x_i^{expected} - x_i\| \quad (1).$$

As described in detail later herein, in one embodiment, the estimating confusion unit 210 is configured to generate an expected value $x_i^{expected}$ of an intuition-related target attribute i by optimizing a loss function $f(x_{all \backslash i})$, wherein, $x_{all \backslash i}$ denotes all attributes except the intuition-related target attribute i.

In one embodiment, the system 200 comprises a combining unit 220 configured to merge an initial prediction 160 from the machine learning model 130 with experts' intuition 170. In one embodiment, the combining unit 220 is configured to receive, as inputs, at least the following: (1) a new data input (e.g., a new service deal) from the database 150, (2) an initial prediction 160 from the machine learning model 130, wherein the initial prediction 160 comprises an estimated/predicted class label ŷ that the machine learning model 130 classifies the new data input with, (3) experts' intuition 170, and (4) an estimated confusion $\|x_i^{expected} - x_i\|$ for an intuition-related target attribute i (e.g., a particular price point) of the new data input. The combining unit 220 is further configured to output a corrected prediction 230 based on the inputs received, wherein the corrected prediction 230 comprises a corrected class label for the new data input.

In one embodiment, the experts' intuition 170 is one of the following forms: (1) a first form of experts' intuition comprising a given prediction (e.g., directly/explicitly provided by an expert), and (2) a second form of experts' intuition comprising a given trend for a relationship between one or more features of the new data input and a prediction (e.g., examples of trends include, but are not limited to, monotonically decreasing, monotonically increasing, first-increasing-then-decreasing, and first-decreasing-then-increasing). For example, if the experts' intuition 170 is the first form of experts' intuition, the experts' intuition 170 comprises a prior class label prior that one or more experts have classified data similar to the new data input with. The prior class label prior is directly-given prediction from the experts.

In one embodiment, if the expected value $x_i^{expected}$ of the intuition-related target attribute i and the actual value $x_i$ of the intuition-related target attribute are substantially the same (i.e., there is high similarity, e.g., the estimated confusion $\|x_i^{expected} - x_i\|$ is substantially about zero or does not exceed a pre-determined error threshold), the combining unit 220 outputs the estimated/predicted class label ŷ as the corrected prediction 230. Therefore, if the estimated confusion $\|x_i^{expected} - x_i\|$ indicates that the intuition-related target attribute i is included/represented in the training data, the combining unit 220 trusts the machine learning model 130 (i.e., can confidently rely on the initial prediction 160) and outputs the initial prediction 160 from the machine learning model 130.

If the difference between the expected value $x_i^{expected}$ of the intuition-related target attribute and the actual value $x_i$ of the intuition-related target attribute is not negligible (i.e., there is low similarity, e.g., the estimated confusion $\|x_i^{expected} - x_i\|$ exceeds the pre-determined error threshold), the combining unit 220 determines whether the difference is small or large. If the difference between the expected value $x_i^{expected}$ of the intuition-related target attribute and the actual value $x_i$ of the intuition-related target attribute is large (e.g., the estimated confusion $\|x_i^{expected} - x_i\|$ exceeds a pre-determined difference threshold), the combining unit 220 relies on the experts' intuition instead of the machine learning model 130 as the model 130 does not appear to be familiar with the new data input. For example, if the experts' intuition 170 is the first form of experts' intuition, the combining unit 220 outputs the prior class label prior (i.e., the directly-given prediction from the experts) as the corrected prediction 230.

If the difference between the expected value $x_i^{expected}$ of the intuition-related target attribute and the actual value $x_i$ of the intuition-related target attribute is small (e.g., the estimated confusion $\|x_i^{expected} - x_i\|$ does not exceed the pre-determined difference threshold), the combining unit 220 is configured to merge the initial prediction 160 from the machine learning model 130 with the experts' intuition 170 from the experts. In one embodiment, if the experts' intuition 170 is the first form of experts' intuition, the combining unit 220 is configured to merge the initial prediction 160 with the experts' intuition 170 by combining the initial prediction 160 with the directly-given prediction from the experts to obtain a linear combination that is output as the corrected prediction 230. In one embodiment, the combining unit 220 is configured to compute the linear combination in accordance with equation (2) provided below:

$$\alpha \cdot prior + (1-\alpha) \cdot \hat{y} \quad (2),$$

wherein α represents a weight.

In one embodiment, the combining unit 220 is configured to determine a weight α to apply via a sigmoid function or another similar function that takes an estimated confusion $\|x_i^{expected} - x_i\|$ as an input. In another embodiment, the combining unit 220 is configured to obtain a weight α from a source such as, but not limited to, the database 150, domain/field experts, etc.

In one embodiment, if the experts' intuition 170 is the second form of experts' intuition, the combining unit 220 is configured to merge the initial prediction 160 with the experts' intuition 170 by applying constraint-based machine learning techniques to implement adjustments.

Figure 3:
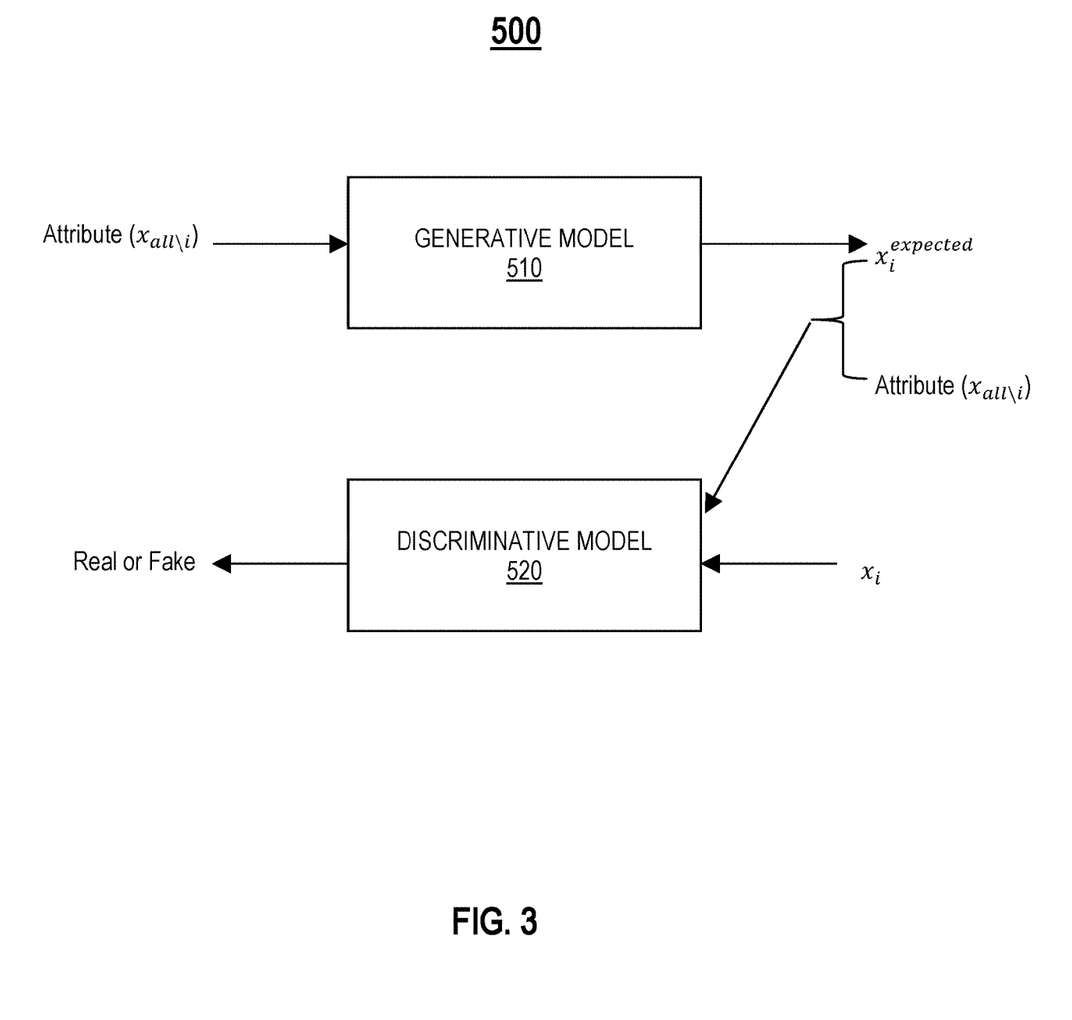
FIG. 3 is an example process performed by the conflict resolution system to estimate confusion for a target attribute, in accordance with an embodiment of the invention.

FIG. 3 is an example process 500 performed by the conflict resolution system 200 to estimate confusion for an intuition-related target attribute, in accordance with an embodiment of the invention. In one embodiment, the estimating confusion unit 210 of the system 200 is configured to: (1) optimize a loss function $f(x_{all \backslash i})$ to generate a realistic expected value $x_i^{expected}$ of an intuition-related target attribute, (2) optimize another loss function to determine whether the expected value $x_i^{expected}$ is accurate/realistic compared to training data, and (3) repeat the optimization of the loss functions until there is convergence, wherein an expected value $x_i^{expected}$ resulting from the convergence is used to estimate confusion for the intuition-related target attribute.

In one embodiment, the estimating confusion unit 210 is configured to quantify a similarity (i.e., similarity quantification) of an unlabeled instance (i.e., a data point) of new data input to training data as a reversed difference from values (e.g., actual values) of intuition-related features of the unlabeled instance to expected values that are conditioned based on values of intuition-free features of the unlabeled instance. For example, in one embodiment, the estimating confusion unit 210 utilizes a Generative Adversarial Network (GAN) to generate/predict a realistic expected value $x_i^{expected}$ of an intuition-related target attribute. The GAN is used to automatically learn correlations between intuition-related attributes and intuition-free attributes, and quantify a difference of a new data input from existing training data. For example, in one embodiment, the GAN comprises a generative model (i.e., a generator model) 510 trained (e.g., by the training system 140) to generate values for intuition-free attributes based on intuition-related attributes, and a discriminative model (i.e., a discriminator model) 520 trained (e.g., by the training system 140) to determine whether a given data point comes from the training data or is generated by the generative model 510. The estimating confusion unit 210 utilizes the discriminative model 520 to determine whether an expected value $x_i^{expected}$ is accurate/realistic compared to the training data. When the two models 510-520 converge, or exactly reach a Nash equilibrium, the generative model 510 is able to generate a data point that is similar to the training data.

In another embodiment, the estimating confusion unit 210 utilizes linear regression to generate a realistic expected value $x_i^{expected}$ of an intuition-related target attribute. For example, in one embodiment, a linear regression model is learned to map intuition-free attributes to intuition-related attributes.

With respect to application scenarios involving IT services' contracts, experts' intuition (e.g., a salesman's expert experience) indicates that the higher a sale price that an IT service provider offers for an IT service deal that the service provider is bidding on, the lower the likelihood of the service provider successfully winning the deal. Training data for such application scenarios may not include whole range of prices for each type of IT service deal. As such, for price points outside of ranges of prices included in the training data, machine learning models trained based on the training data may perform poorly when predicting a likelihood of an IT service provider successfully bidding on an IT service deal (i.e., winning probability) against sale prices based on attributes of the deal. For example, for some deals, a relationship between a sale price and a wining probability of winning may be flat (or even increasing) for very high sale prices (e.g., for a particular price range, the higher the sale price, the higher the chances of winning the deal because some clients may be skeptical of very low sale prices even if they want sale prices to be as cheap as possible). Embodiments of the invention can be used in IT services' contracts to estimate/predict a likelihood of an IT service provider successfully bidding on an IT service deal (i.e., winning probability) against sale prices based on attributes of the deal.

Figure 4A:
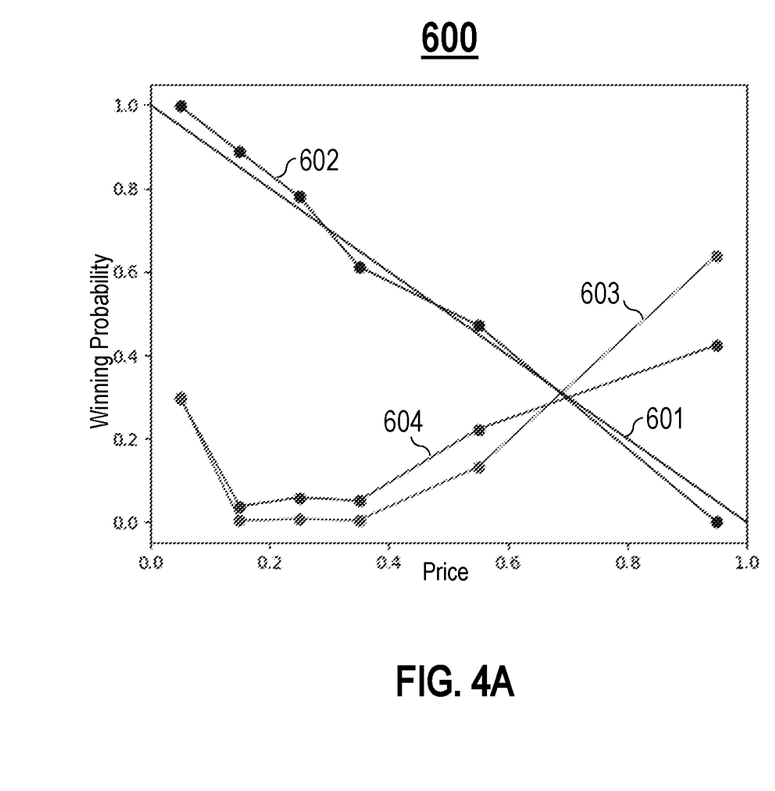
FIG. 4A is an example graph illustrating predicting winning probability against sale prices using conventional solutions.

FIG. 4A is an example graph 600 illustrating predicting winning probability against sale prices using conventional solutions. The graph 600 includes a first curve 601 representing winning probability predicted using experts' intuition only, a second curve 602 representing winning probability predicted using experts' intuition only with price discretized, a third curve 603 representing winning probability predicted using logistic regression with no intuition, and a fourth curve 604 representing winning probability predicted using logistic regression with expectation regularization.

Figure 4B:
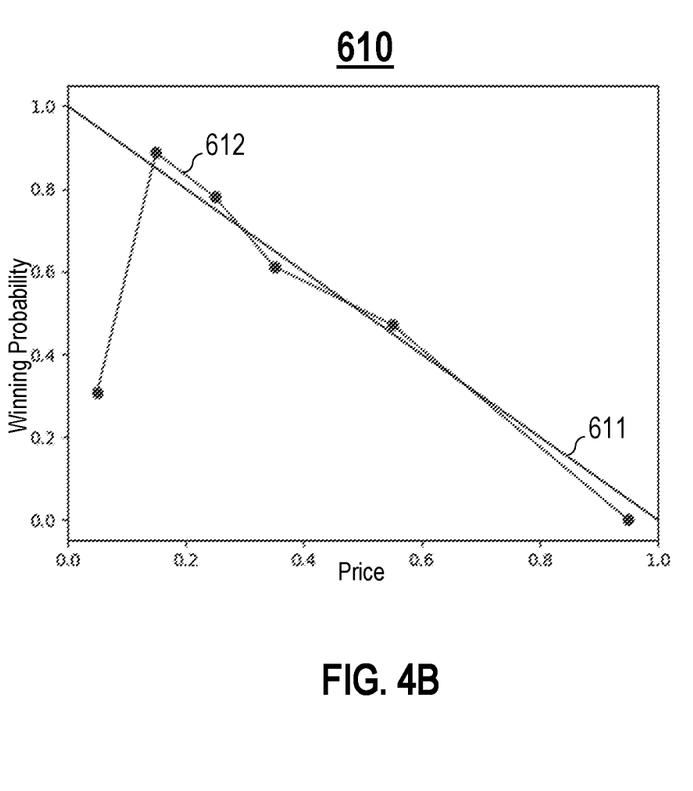
FIG. 4B is an example graph illustrating predicting a winning probability against sale prices using the conflict resolution system, in accordance with an embodiment of the invention.

FIG. 4B is an example graph 610 illustrating predicting a winning probability against sale prices using the conflict resolution system 20 Group II values 0, in accordance with an embodiment of the invention. The graph 610 includes a first curve 611 representing winning probability predicted using experts' intuition only, and a second curve 612 representing winning probability predicted using the conflict resolution system 200.

Figure 5:
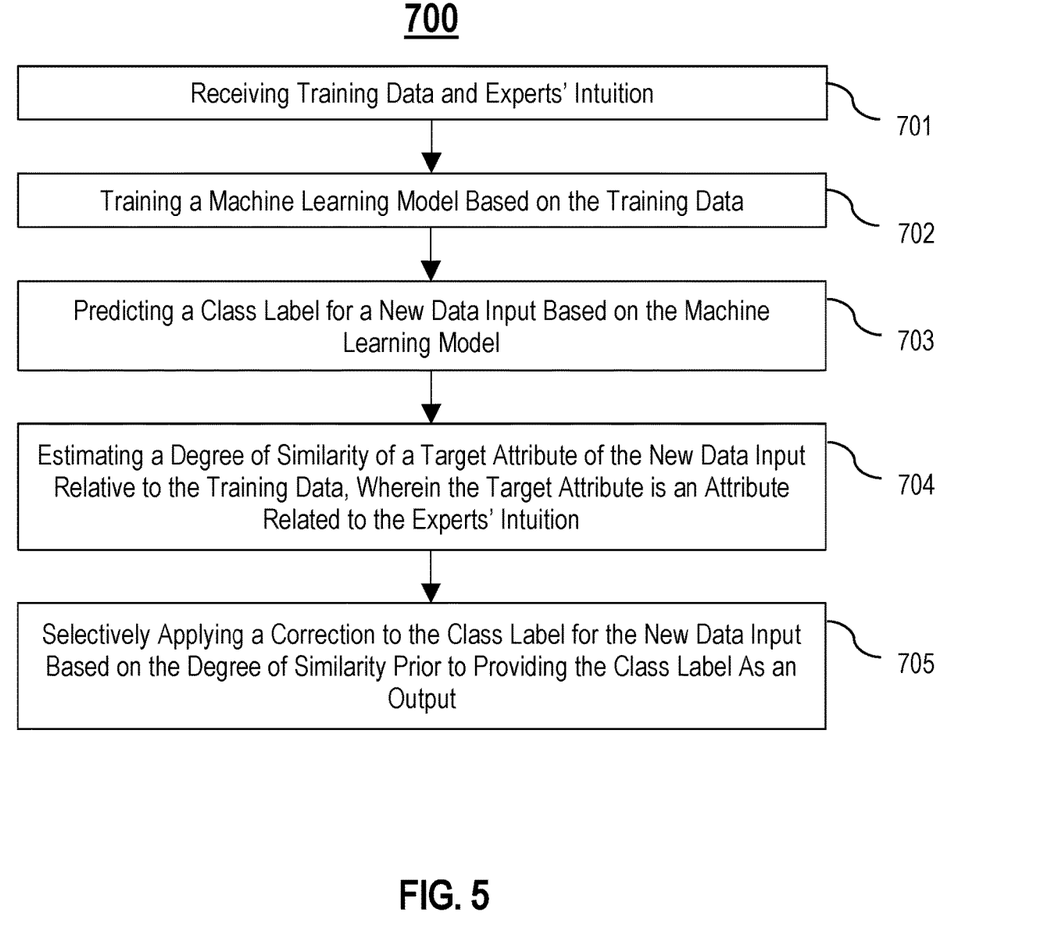
FIG. 5 is a flowchart for an example process for resolving conflicts between experts' intuition and data-driven machine learning models, in accordance with an embodiment of the invention.

FIG. 5 is a flowchart for an example process 700 for resolving conflicts between experts' intuition and data-driven machine learning models, in accordance with an embodiment of the invention. Process block 701 includes receiving training data and experts' intuition. Process block 702 includes training a machine learning model based on the training data. Process block 703 includes predicting a class label for a new data input based on the machine learning model. Process block 704 includes estimating a degree of similarity of a target attribute of the new data input relative to the training data, wherein the target attribute is an attribute related to the experts' intuition. Process block 705 includes selectively applying a correction to the class label for the new data input based on the degree of similarity prior to providing the class label as an output.

In one embodiment, process blocks 701-705 are performed by one or more components of the system 200.

Figure 6:
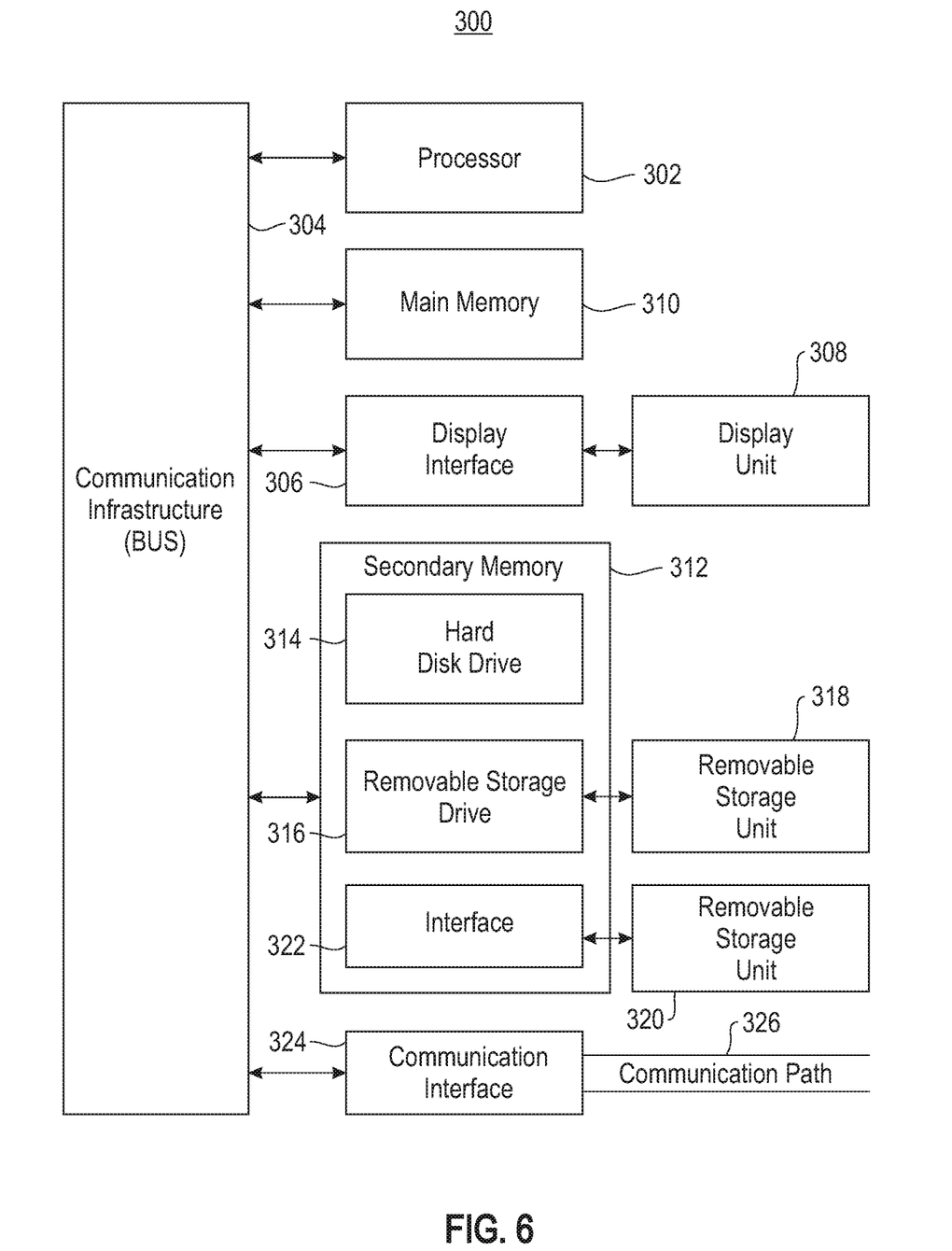
FIG. 6 is a high level block diagram showing an information processing system useful for implementing an embodiment of the present invention.

FIG. 6 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the voice communication infrastructure 304 (or from a frame buffer not shown) for display on a display unit 308. In one embodiment, the computer system also includes a main memory 310, preferably random access memory (RAM), and also includes a secondary memory 312. In one embodiment, the secondary memory 312 includes, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 includes other similar means for allowing computer programs or other instructions to be loaded into the computer system. Such means include, for example, a removable storage unit 320 and an interface 322. Examples of such means include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

In one embodiment, the computer system also includes a communication interface 324. Communication interface 324 allows software and data to be transferred between the computer system and external devices. In one embodiment, examples of communication interface 324 include a modem, a network interface (such as an Ethernet card), a communication port, or a PCMCIA slot and card, etc. In one embodiment, software and data transferred via communication interface 324 are in the form of signals which are, for example, electronic, electromagnetic, optical, or other signals capable of being received by communication interface 324. These signals are provided to communication interface 324 via a communication path (i.e., channel) 326. In one embodiment, this communication path 326 carries signals and is implemented using wire or cable, fiber optics, a phone line, a cellular phone link, an RF link, and/or other communication channels.

Embodiments of the present invention provide a system, a method, and/or a computer program product. In one embodiment, the computer program product includes a computer readable storage medium (or media) having computer readable program instructions thereon for causing a processor to carry out aspects of the embodiment of the present invention.

The computer readable storage medium can be a tangible device that can retain and store instructions for use by an instruction execution device. In one embodiment, the computer readable storage medium is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of embodiments of the present invention are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one embodiment, the remote computer is connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one embodiment, these computer readable program instructions are provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one embodiment, these computer readable program instructions are also stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one embodiment, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, in one embodiment, each block in the flowchart or block diagrams represents a module, segment, or portion of instructions, which comprises one or more executable instructions for implementing the specified logical function(s). In some alternative implementations, the functions noted in the block occur out of the order noted in the figures. For example, in one embodiment, two blocks shown in succession are, in fact, executed substantially concurrently, or the blocks are sometimes executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the present invention provide a system, computer program product, and method for implementing the embodiments of the invention. Embodiments of the present invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the present invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. Various embodiments of the invention were chosen and described in order to best explain the principles of the embodiments of the invention and the practical application, and to enable others of ordinary skill in the art to understand the embodiments of the invention with various modifications as are suited to the particular use contemplated.

The invention claimed is:

1. A method comprising:
receiving training data and experts' intuition data, wherein the experts' intuition data is indicative of one or more insights of one or more experts in a particular domain;
training a machine learning model based on the training data;
predicting a class label for a new data input based on the machine learning model;
estimating a degree of similarity of a target attribute of the new data input relative to the training data, wherein the target attribute is an attribute related to the one or more insights of the one or more experts; and
resolving any conflicts between the one or more insights of the one or more experts and the machine learning model by selectively applying a correction to the class label for the new data input based on the degree of similarity prior to providing the class label as an output, wherein the correction involves combining, based on a weight, the class label with a prior class label obtained from the experts' intuition data.

2. The method of claim 1, wherein estimating a degree of similarity of a target attribute of the new data input relative to the training data comprises:
generating an expected value of the target attribute by optimizing a first loss function; and
determining whether the expected value is realistic relative to the training data by optimizing a second loss function.

3. The method of claim 2, wherein the loss functions are repeatedly optimized until a convergence between the loss functions occurs.

4. The method of claim 3, wherein estimating a degree of similarity of a target attribute of the new data input relative to the training data further comprises:
in response to the convergence, estimating confusion for the target attribute by computing a difference between the expected value and an actual value of the target attribute.

5. The method of claim 1, wherein the degree of similarity is estimated using a Generative Adversarial Network (GAN).

6. The method of claim 1, wherein the degree of similarity is estimated using a linear regression model.

7. The method of claim 4, wherein selectively applying a correction to the class label for the new data input based on the degree of similarity comprises:
outputting the class label without any corrections in response to determining the expected value and the actual value are substantially the same.

8. The method of claim 4, wherein selectively applying a correction to the class label for the new data input based on the degree of similarity comprises:
correcting the class label in response to determining the expected value and the actual value are different, wherein the class label is corrected using a weighted linear combination that includes the class label, the weight, and the prior class label obtained from the experts' intuition data.

9. The method of claim 8, wherein the weight is obtained from a function.

10. The method of claim 8, wherein the weight is obtained from the one or more experts.

11. A system comprising:
at least one processor; and
a non-transitory processor-readable memory device storing instructions that when executed by the at least one processor causes the at least one processor to perform operations including:
receiving training data and experts' intuition data, wherein the experts' intuition data is indicative of one or more insights of one or more experts in a particular domain;
training a machine learning model based on the training data;
predicting a class label for a new data input based on the machine learning model;
estimating a degree of similarity of a target attribute of the new data input relative to the training data, wherein the target attribute is an attribute related to the one or more insights of the one or more experts; and resolving any conflicts between the one or more insights of the one or more experts and the machine learning model by selectively applying a correction to the class label for the new data input based on the degree of similarity prior to providing the class label as an output, wherein the correction involves combining, based on a weight, the class label with a prior class label obtained from the experts' intuition data.

12. The system of claim 11, wherein estimating a degree of similarity of a target attribute of the new data input relative to the training data comprises:

generating an expected value of the target attribute by optimizing a first loss function; and determining whether the expected value is realistic relative to the training data by optimizing a second loss function.

13. The system of claim 12, wherein the loss functions are repeatedly optimized until a convergence between the loss functions occurs.

14. The system of claim 13, wherein estimating a degree of similarity of a target attribute of the new data input relative to the training data further comprises:

in response to the convergence, estimating confusion for the target attribute by computing a difference between the expected value and an actual value of the target attribute.

15. The system of claim 11, wherein the degree of similarity is estimated using a Generative Adversarial Network (GAN).

16. The system of claim 11, wherein the degree of similarity is estimated using a linear regression model.

17. The system of claim 14, wherein selectively applying a correction to the class label for the new data input based on the degree of similarity comprises:

outputting the class label without any corrections in response to determining the expected value and the actual value are substantially the same.

18. The system of claim 14, wherein selectively applying a correction to the class label for the new data input based on the degree of similarity comprises:

correcting the class label in response to determining the expected value and the actual value are different, wherein the class label is corrected using a weighted linear combination that includes the class label, the weight, and the prior class label obtained from the experts' intuition data.

19. The system of claim 18, wherein the weight is obtained from a function or the one or more experts.

20. A computer program product for cognitive visual and ontological mapping of tabular data, the computer program product comprising a computer readable storage medium having program instructions embodied therewith, the program instructions executable by a processor to cause the processor to:

receive training data and experts' intuition data, wherein the experts' intuition data is indicative of one or more insights of one or more experts in a particular domain;

train a machine learning model based on the training data;

predict a class label for a new data input based on the machine learning model;

estimate a degree of similarity of a target attribute of the new data input relative to the training data, wherein the target attribute is an attribute related to the one or more insights of the one or more experts; and resolving any conflicts between the one or more insights of the one or more experts and the machine learning model by selectively applying a correction to the class label for the new data input based on the degree of similarity prior to providing the class label as an output, wherein the correction involves combining, based on a weight, the class label with a prior class label obtained from the experts' intuition data.

* * * * *